June 24, 1952  W. Z. JARMICKI  2,601,660
SPOOL CONSTRUCTION
Filed July 6, 1948
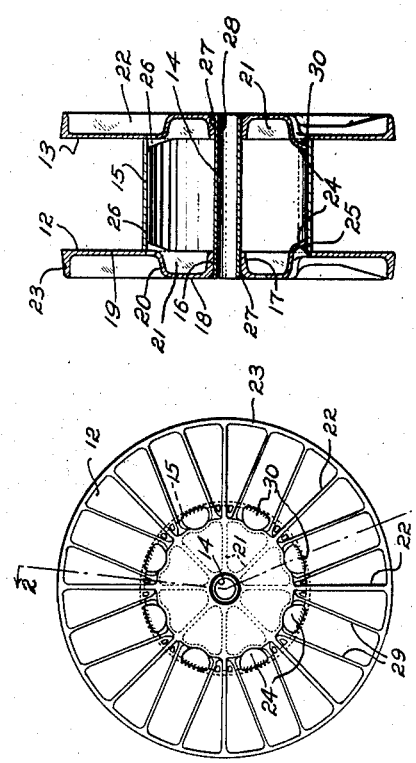
Inventor:
Wincenty Z. Jarmicki
By Alex. E. MacRae
Attorney.

UNITED STATES PATENT OFFICE

2,601,660

SPOOL CONSTRUCTION

Wincenty Zygmunt Jarmicki, Toronto, Ontario, Canada, assignor to Dominion Magnesium Limited, Toronto, Ontario, Canada, a corporation of Ontario Application July 6, 1948, Serial No. 37,142

1 Claim. (Cl. 242—118)

This invention relates to spools for carrying threads or wires.

Spools for carrying wires and the like usually comprise four main parts, namely, two similar end flanges, a center tube on the ends of which the flanges are mounted, and a cylindrical drum on which the wire is wound. Various ways of arranging and assembling the parts have heretofore been proposed with a view to providing economical manufacture. In the larger type of spool having end flanges of, for instance, 8 to 24 inches or greater in diameter, and adapted to carry heavy wires, the problem is to combine ease and economy of manufacture with required strength of structure. Generally speaking, in the past, the rigid assembly of the various parts in relation to each other, in such manner to ensure that the completed spool will withstand all normal strains to which it is subjected, has resulted in relatively involved and costly manufacturing procedures.

It is an object of the present invention to provide a spool for carrying wires and the like which, while possessing necessary strength of structure, is of simple and economical manufacture. More specifically, an object is to provide a spool structure comprising simple and effective assembly means for the tube and barrel in relation to the flanges, and a method of assembling such parts including a single pressing or assembling step and a single welding step.

The invention will be described with reference to the accompanying drawing, in which Figure 1 is an end elevation of a spool in accordance with the invention, and Figure 2 is a longitudinal section on line 2—2 of Figure 1.

Referring to the drawing, the spool shown comprises two substantially identical end flanges 12 and 13, an axial tube 14, and a drum 15.

Each flange comprises a disc-like member having an axial bore 16 in a hub portion 17. The flange has an inner radial portion 18 disposed in the outer plane of the flange and from which the hub 17 extends axially rearwardly, and an outer radial portion 19 disposed in an plane forwardly offset from the plane of the portion 18, such portions being joined by the connecting portion 20. A series of strengthening ribs 21 extend radially from the hub 17 to the inner surface of portion 20, and a series of strengtheing ribs 22 extend radially from the outer surface of portion 20 to the rim 23 of the spool, the two series of ribs being thereby disposed on opposite faces of the flange. A third series of substantially parallel pairs of ribs 29 are also preferably provided between each adjacent pair of ribs 22.

The portion 19 is provided with a series of uniformly spaced inwardly directed lugs 24 constituted by angularly offsetting a portion of the wall of portion 19 thus producing weld openings 25 in the wall. As shown, the lugs 24 and weld openings 25 adjoin the connecting portion 20. Drum locating lugs 26 may also be provided on the inside surface of the flanges, such lugs being continuations of the respective ribs 21.

While the parts of the spool may be formed from various materials, it is preferable, for high strength light weight requirements, that the flanges and barrel be made of light weight alloys such as magnesium and the tube of steel.

The outside diameter of the tube 14 is preferably at least as great as the inside diameter of bore 16, especially when the tube is of steel and the flanges of a softer metal such as magnesium, to provide a press fit engagement between the ends of the tube and the hubs of the flanges. Preferably also, in such case, the hub-engaging surfaces of the tube are finely knurled to accentuate the frictional engagement of the tube and hubs.

The inside diameter of the drum 15 coincides approximately with the diameter of a circle passing through the outer limit of the weld openings 25. Thus, the deflected wall portions 24 also constitute positioning lugs for the drum to locate it in proper relative position with respect to the end flanges.

It will be observed that, with the four parts of the spool arranged in axial relation, a single pressing operation is sufficient to assemble the tube and flanges and to position the drum in proper relation thereto. Thereafter the drum is welded to the outer edge of each opening 25 and to the deflected adjacent edge portion of lug 24, as indicated at 30, this operation being readily effected from the ends of the spool.

If desired, the tube 14 may also be formed of a light weight metal such as a magnesium alloy. In such case, the ends of the tube may be free from knurling and may be secured to the flanges by means of an annular weld 27, the outer corner of the bore 16 being bevelled, as indicated at 28, to provide space therefor.

Thus, the assembly of the spool involves two simple steps only, a pressing or assembling step and a welding step. The resulting spool possesses great strength and rigidity amply sufficient to withstand all normal stresses to which it may be subjected in use.

What is claimed is:

A spool for wire and the like comprising a pair of end discs each having a peripheral rim, an inner annular plane portion, an outer annular plane portion lying in a plane rearwardly offset from the plane of the inner portion, an annular web joining said portions, an axial hub extending rearwardly from said inner portion, a plurality of ribs on the inner portion joining the hub and web, a plurality of ribs on the outer portion joining the rim and web and a series of inwardly deflected and uniformly spaced wall portions in the outer portion in uniform radial relation to the hub, each said deflected wall portion providing a complementary wall opening in the outer portion, an axial supporting member having its end portions mounted in the hubs, and a material-carrying member having each of its end portions overlying a series of said deflected wall portions and welded thereto.

WINCENTY ZYGMUNT JARMICKI.

REFERENCES CITED

The following references are of record in the file of this patent:

UNITED STATES PATENTS

| Number | Name | Date |
| --- | --- | --- |
| 851,367 | Mossberg | Apr. 23, 1907 |
| 962,452 | Mossberg | June 28, 1910 |
| 1,469,930 | McIntosh | Oct. 9, 1923 |
| 1,811,517 | Mossberg | June 23, 1931 |
| 1,842,113 | Quigg | Jan. 19, 1932 |
| 1,842,143 | Bowen | Jan. 19, 1932 |
| 2,170,334 | Lacks | Aug. 22, 1939 |